(12) United States Patent
Matsubara et al.

(10) Patent No.: US 6,634,447 B1
(45) Date of Patent: Oct. 21, 2003

(54) CONTROL DEVICE FOR HYBRID VEHICLE

(75) Inventors: Atsushi Matsubara, Wako (JP); Hironao Fukuchi, Wako (JP); Asao Ukai, Wako (JP); Takashi Iwamoto, Wako (JP); Fumihiko Konno, Wako (JP); Katsuhiro Kumagai, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/661,017

(22) Filed: Sep. 13, 2000

(30) Foreign Application Priority Data

Sep. 16, 1999 (JP) .......................................... 11-262635

(51) Int. Cl.$^7$ .............................. B60K 6/00; B60K 1/00
(52) U.S. Cl. ..................... 180/65.2; 180/65.3; 180/65.4
(58) Field of Search ................................ 180/65.2, 65.8, 180/65.3; 475/5; 318/139; 701/22; 60/698, 716

(56) References Cited

U.S. PATENT DOCUMENTS

| | | | | |
|---|---|---|---|---|
| 4,335,429 A | * | 6/1982 | Kawakatsu | 364/424 |
| 5,789,881 A | * | 8/1998 | Egami et al. | 318/139 |
| 5,951,614 A | * | 9/1999 | Tabata et al. | 701/54 |
| 5,984,033 A | * | 11/1999 | Tamagawa et al. | 180/65.2 |
| 6,018,694 A | * | 1/2000 | Egami et al. | 701/102 |
| 6,026,921 A | * | 2/2000 | Aoyama et al. | 180/65.2 |
| 6,190,282 B1 | * | 2/2001 | Deguchi et al. | 477/5 |
| 6,202,776 B1 | * | 3/2001 | Masberg et al. | 180/65.2 |
| 6,232,733 B1 | * | 5/2001 | Obayashi et al. | 318/432 |
| 6,233,508 B1 | * | 5/2001 | Deguchi et al. | 701/22 |
| 6,247,437 B1 | * | 6/2001 | Yamaguchi et al. | 123/179.3 |
| 6,253,127 B1 | * | 6/2001 | Itoyama et al. | 701/22 |

FOREIGN PATENT DOCUMENTS

JP            7-123509            5/1995

* cited by examiner

Primary Examiner—Brian L. Johnson
Assistant Examiner—G B Klebe
(74) Attorney, Agent, or Firm—Armstrong, Westerman & Hattori, LLP

(57) ABSTRACT

A control device for a hybrid vehicle that responds reliably to the assist requests of a driver from start-up to departure of the vehicle. The control system for a hybrid vehicle equipped with an engine that outputs the start force for the vehicle, an electric motor that supplements the output of the engine, and a battery that supplies electrical power to the engine, provides an engine rotation speed sensor and an output assistance determination device that determines as to whether or not to carry output assistance using the motor depending on the state of the driving of the vehicle, and wherein the output assistance determination device provides an after-start-up output assistance permission means that permits output assistance of the engine by the electric motor in the case that the engine rotation speed detection means detects that the engine rotation speed is equal to or greater than a predetermined value during start-up of the engine, and in the case that the output assistance is permitted by the after-start-up output assistance permission device, output assistance of the engine by the electric motor is carried out.

4 Claims, 13 Drawing Sheets

US 6,634,447 B1

CONTROL DEVICE FOR HYBRID VEHICLE

BACKGROUND OF THE INVENTION

1. Field of the Invention

The present invention relates to a control device for a hybrid vehicle, and in particular relates to a hybrid vehicle that can respond quickly to an assist requirement of a driver at the time of starting the vehicle.

2. Description of the Related Art

Conventionally, a hybrid vehicle provided with an electric motor in addition to a combustion engine serving as a source of drive during the operation of the vehicle is known.

One type of this kind of hybrid vehicle is a parallel hybrid vehicle that uses an electric motor as an auxiliary drive source to assist the output of the combustion engine. This parallel hybrid vehicle carries out various types of control such as, for example, providing auxiliary drive force to the output of the engine by the electric motor during acceleration and charging the battery by deceleration regeneration during deceleration, and maintaining the state of charge of the battery, in order to fulfill the needs of the driver (for example, Japanese Unexamined Patent Application, First Publication, 7-123509).

However, in the above described hybrid vehicle, in the case of requiring an assist depending on the intention of the driver to accelerate the vehicle, an auxiliary drive force may be supplied to the output of the engine by the motor, and the intention of the driver to accelerate the vehicle takes various forms depending on the driving conditions. For example, there is the case in which the driver depresses the accelerator pedal in order to accelerate immediately after the vehicle starts, and the case in which the driver depresses the accelerator pedal during driving in order to accelerate. In particular, in a hybrid vehicle, when the vehicle is stopped, idling is stopped to improve fuel consumption. However, in most cases, each time the engine is stopped due to a traffic signal, the driver depresses the accelerator pedal to accelerate the vehicle after the engine has started.

Therefore, there is the problem that it is impossible to respond to all of the needs of the driver by supplying the assist of the motor by simply determining the need of the assist by the motor from the driver's intent to accelerate during normal travel.

Thus, the present invention provides a control device for a hybrid vehicle that can accurately respond to the assist request of the driver from the start-up to start of the vehicle.

SUMMARY OF THE INVENTION

In order to resolve the above-described problems, the invention described in claim 1 provides a control device for a hybrid vehicle comprising a combustion engine that outputs driving power to the vehicle (for example, engine E in the embodiment), an electric motor for assisting the output of the engine (for example, the motor M in the embodiment), an electric storage device that supplies electric power to this motor (for example, the battery 3 in the embodiment), an output assist determination device that determines appropriateness of assisting the engine output by the motor depending on the driving state of the vehicle (for example, step S004 in the embodiment), a control amount setting device that sets the control amount of the motor depending on the driving state of the engine in the case that a determination is made to carry out assisting of the output of the engine with the motor by the output assist determination device (for example, steps S029, S033, and S034 in the embodiment), an output assist control device that carries out assisting of the output to the engine by the motor based on the control amount set by the control amount setting device (for example, the motor ECU1 in the embodiment), an engine rotation speed detection device (for example, the engine rotation speed sensor S2 in the embodiment) that detects the rotation speed of the engine (for example, the engine rotation speed NE in the embodiment), and an after-start-up output assist permission device that permits an assist of the engine output by the motor when the engine rotation speed detection device has detected that the engine rotation speed has exceeded a predetermined rotation speed during the engine start-up (for example, step S005 in the embodiment), wherein the assist of the engine output by the motor is carried out by the output assist control device when the output assist is permitted by the after-start-up output assist permission device.

By constituting the control device for the hybrid vehicle in this manner, at the time of cranking by the electric motor during start-up, for example, when the engine rotation speed detecting device has determined that the engine rotation speed exceeds the rotation speed that provides the torque that allows the engine to rotate and then drive under its own power after the engine start-up operation, in the case that the output assist determination device has determined that the driver has the intention of accelerating, the after-start-up output assist permission device permits applying an assist drive to the engine from the motor.

A second aspect of the invention is that a predetermined engine rotation speed is the rotation speed that provides the engine to rotate and then drive under its own power after the engine start-up operation (for example, the predetermined value #TMOTST in the embodiment).

By constituting the control device of the hybrid vehicle as described above, the engine can be converted quickly to self-powered movement.

DETAILED DESCRIPTION OF THE PREFERRED EMBODIMENT

Hereinafter, a preferred embodiment of the present invention will be explained with reference to the attached drawings.

Figure 1:
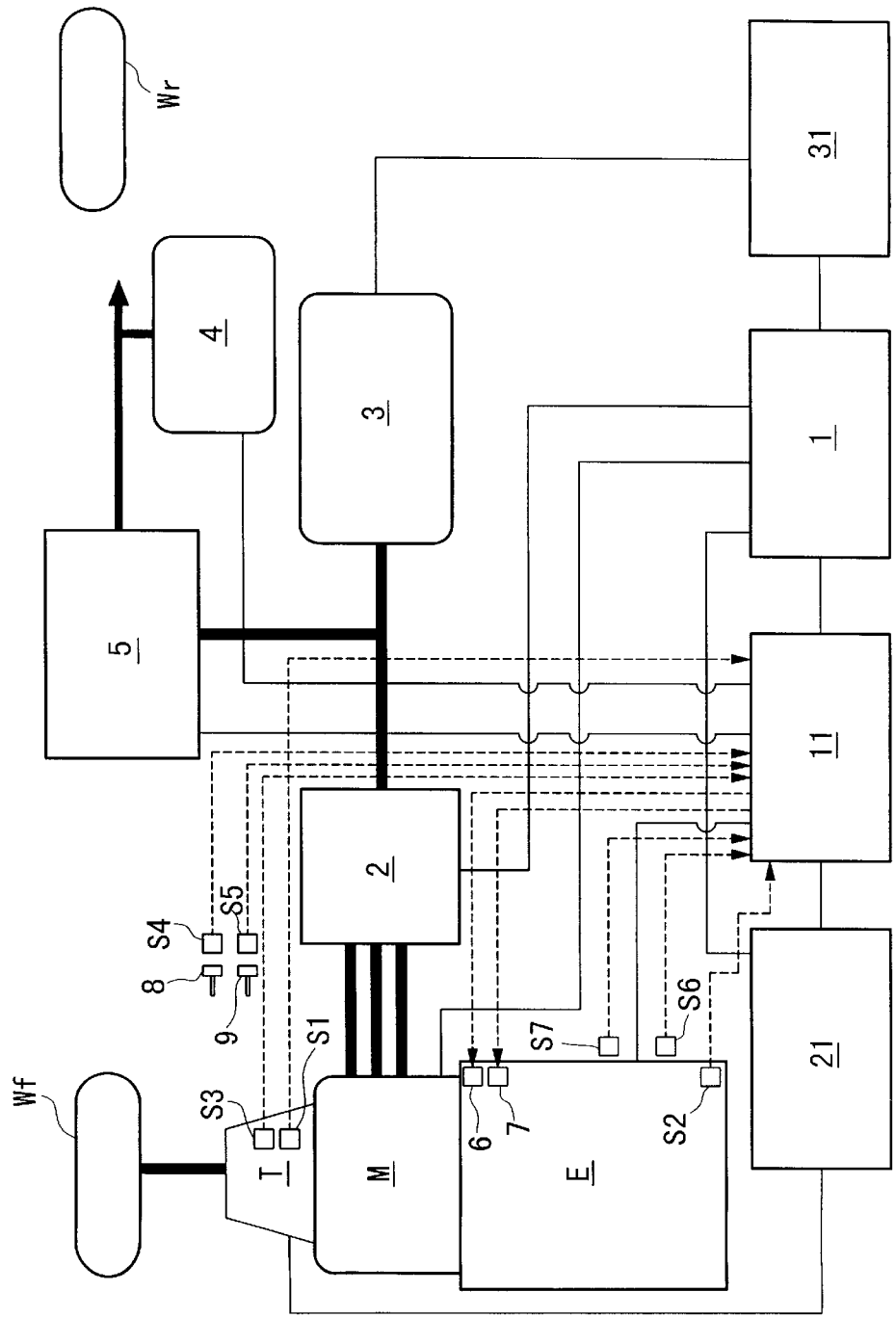
FIG. 1 is a diagram showing the structure of the entire hybrid vehicle.

FIG. 1 shows the embodiment used in a parallel hybrid vehicle, and the drive power of both the engine E and the motor M is transmitted to front wheels Wf and Wf, which are the driving wheels, through a transmission T that comprises an automatic transmission or a manual transmission. In addition, during deceleration of the hybrid vehicle, when the drive force is transmitted from the front wheels Wf and Wf to the motor M, the motor M generates what is termed a regeneration braking force by functioning as a generator, and the kinetic energy of the vehicle is recovered as electrical energy.

The regenerative operation of the motor M is carried out by the power drive unit 2 by receiving a control command from the motor ECU1. At the power drive unit 2, the motor M and the battery 3 of the high voltage system that transmits and receives the electrical energy are connected, and the battery 3 has, for example, a plurality of modules connected in series, with these modules, in turn, comprising a plurality of cells connected in series, and serving as a unit. In the hybrid vehicle, a 12 V auxiliary battery 4 for driving various types of accessories is provided, and this auxiliary battery 4 is connected to the battery 3 through the downverter 5. The downverter 5 that is controlled by the FIECU 11 charges the auxiliary battery 4 by reducing the voltage of the battery 3.

In addition to the motor ECU 1 and the downverter 5, the FIECU 11 carries out control of the operation of the fuel supply amount control device 6 that controls the amount of the fuel supplied to the engine E and other operations of the starter motor 7 and the ignition timing, etc. In order to perform this, the FIECU 11 inputs the signal from the speed sensor S1 that detects the speed V based on number of rotations of the drive axle of the transmission, a signal from the engine rotation speed sensor S2 that detects the engine rotation speed NE, a signal from the shift position sensor S3 that detects the shift position of the transmission T, a signal from the break switch S4 that detects the operation of the brake pedal 8, a signal from the clutch switch S5 that detects the operation of the clutch pedal 9, a signal from the throttle opening sensor S6 that detects the degree of throttle opening TH, and a signal from the intake pipe pressure sensor S7 that detects the intake pipe pressure PB. In FIG. 1, reference numeral 21 denotes the CVTECU for CVT control, and reference numeral 31 denotes the battery ECU that protects the battery 3 and calculates the state of charge SOC of the battery 3.

In the control mode of this hybrid vehicle, there are the "motor start-up mode" in which the start-up of the engine is carried out by the motor, the "idle stop mode" in which the engine is stopped under predetermined conditions, such as when the vehicle has stopped, an "idle mode" that maintains the engine in an idle state after fuel has been cut off, a "deceleration mode" in which regenerative operation is carried out by the motor, an "acceleration mode" in which the engine is provided an assist drive by the motor, and a "cruise mode" in which the motor is not operating and the car travels under the drive power of the engine.

Next, the zoning of the state of charge SOC is described. The calculation of the state of charge the battery is carried out in the battery ECU 31, and the calculation is carried out based on the voltage, discharge current, temperature, etc.

An example is described below: zone A (from SOC of 40% to an SOC of from 80% to 90%) serves as the normal use range; below the zone A is zone B (from SOC of 20% to an SOC of 40%) which serves as a temporary use range; and below zone B is zone C (from SOC of 0% to an SOC of 20%), which serves as an over-discharge range. Above zone A, zone D (an SOC from 80% to 90% to an SOC of 100%) is provided as an over-charge range.

The detection of the state of charge SOC in zones A and B is carried out by calculating the current value, while in zones C and D, it is carried out by detecting, for example, the voltage value depending on the characteristics of the battery, Moreover, at the boundary of each zone, a hysteresis is set so as to provide threshold values having an upper limit and a lower limit, and such that this threshold value differs during an increase or decrease in the state of charge of the battery SOC.

Figure 2:
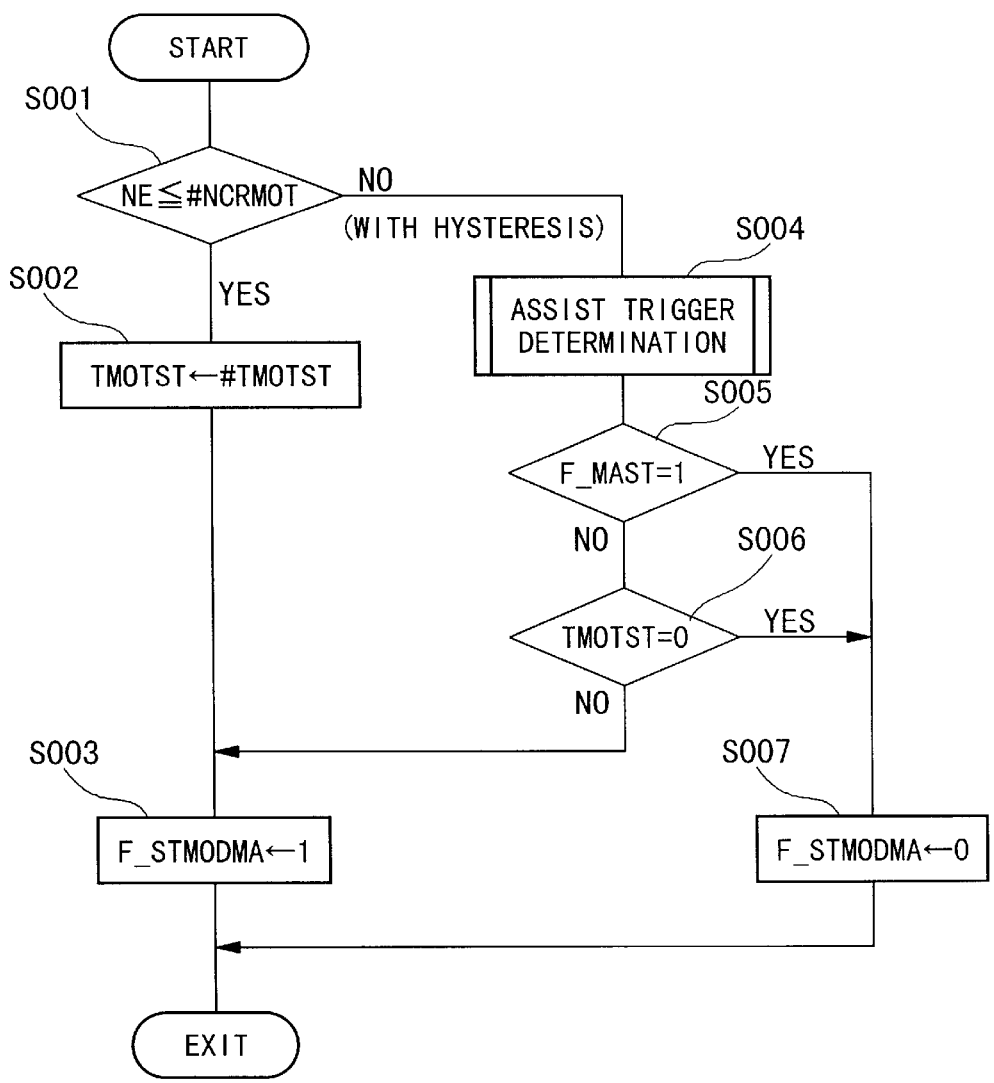
FIG. 2 is a flowchart showing the motor start-up mode.

Next, the motor start-up mode determination processing will be explained. FIG. 2 is a flowchart showing the motor start-up mode determination processing.

In step S001, a determination is made as to whether or not the engine rotation speed NE is equal to or less than a predetermined value #NCRMOT (for example, 900 rpm). Here, the predetermined value #NCRMOT represents the engine rotation speed that provides the torque that makes possible the engine starting up under its own power. When the result of the determination in step S001 is "YES", in step S002, the motor start-up timer TMOTST is set to the predetermined value #TMOTST, and then the flow goes to step S003. In step S003, the motor start-up request flag F_STMODMA is set to "1", and the flow goes to "EXIT".

Again, returning to step S001, in step S001 a determination is made as to whether or not the engine rotation speed NE is equal to or less than a predetermined value #NCRMOT, and when the engine rotation speed is greater than the predetermined value #NCRMOT, the flow goes to step S004, wherein an assist trigger determination described below is carried out, and the flow goes to step S005. In step S005, a determination is made as to whether or not the motor assist determination flag F_MAST is "1", that is, a determination is made as to whether or not the current mode is the acceleration mode.

When the result of the determination in step S005 is "YES", that is, the current mode is the acceleration mode, in step S007, the motor start-up request flag F_STMODMA is set to "0", and goes to EXIT. When the result of the determination in step S005 is "NO", that is, when the current mode is not the acceleration mode, the flow goes to step S006, where it is determined as to whether or not the motor start-up timer TMOTST is "0".

When the result of the determination in step S006 is that the motor start-up timer TMOTST=0, the flow goes to step S007. When the result of the determination in step S007 is that the motor start-up timer TMOTST≠0, then the flow goes to step S003, and continues as-is in the start-up mode. Therefore, in this manner, in the case that the engine rotation speed NE is equal to or greater than the predetermined value #NCRMOT, even during cranking, the assist trigger determination is carried out.

Here, there are two types of assist trigger determinations: the normal assist trigger and the start assist trigger. In a CVT vehicle, in order to improve the start performance, the start assist trigger determination is processing for calculating the assist trigger value and the assist amount during starting separately from the normal assist trigger determination when the degree of throttle opening has a high value that exceeds a predetermined value.

Below, the contents related to the acceleration mode, the normal assist trigger determination, and the start assist trigger determination and their interrelationships will be explained.

Figure 3:
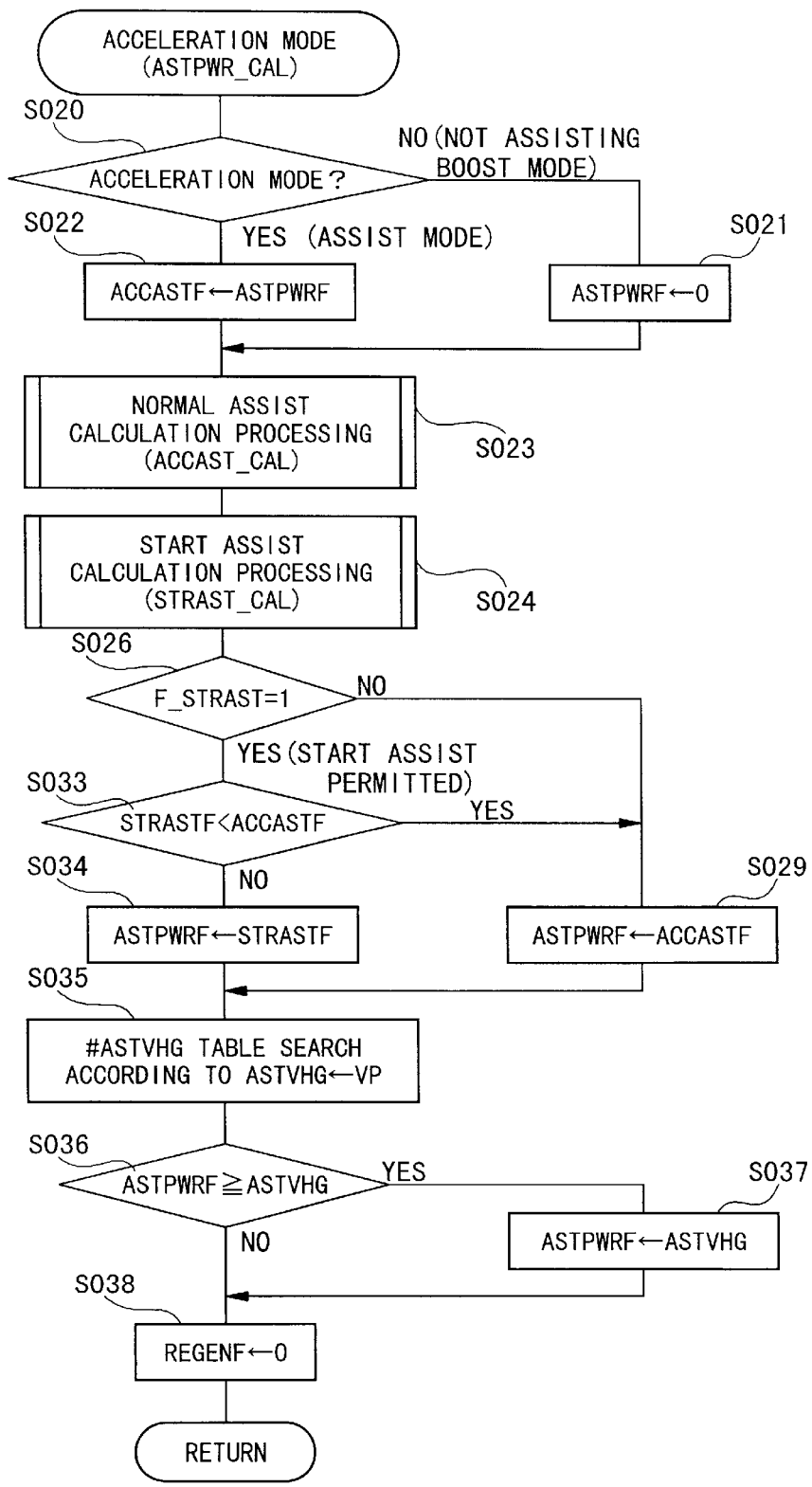
FIG. 3 is a diagram showing a flowchart of an acceleration mode.

FIG. 3 shows a flowchart of the acceleration mode. In the acceleration mode, the assist amount is calculated, but in the case that the normal assist trigger determination and the start assist trigger determination have been carried out, the larger among the two is selected.

In step S020, a determination is made as to whether or not the current mode is the acceleration mode, and when the result of the determination is that it is not the acceleration mode, in step S021, the final assist command value ASTPWRF is set to "0", and the flow goes to step S023. When the result of the determination in step S020 indicates that the current mode is the acceleration mode, then in step S022, the final assist command value ASTPWRF is assigned in the normal assist final calculated value ACCASTF, and the flow goes to step S023.

In step S023, normal assist calculation processing is carried out, in step S024, the start assist calculation processing is carried out, and the calculation of the assist amount is carried out based on each of the flow charts described below. In addition, in step S026, a determination is made as to whether or not the start assist permission flag F_STRAST is "1". When the result of the determination is "YES", the flow goes to step S033, wherein a determination is made as to whether or not the final normal assist calculated value ACCASTF is greater than the final start assist calculated value STRASTF. When the result of the determination in step S033 is "YES", the flow goes to step S029. When the result of the determination in step S033 is "NO", the flow goes to step S034. In the case that the result of the determination in step S026 is "NO", flow goes to step S029.

Furthermore, in step S034, the final assist command value ASTPWRF is assigned the final start assist calculated value STRASTF, and in step S019, the final assist command value ASTPWRF assigned the final normal assist calculated value ACCASTF. Therefore, by the determinations of the previous steps, the largest numerical values of the final start assist calculated value STRASTF and the final normal assist calculated value ACCASTF are set.

Figure 4:
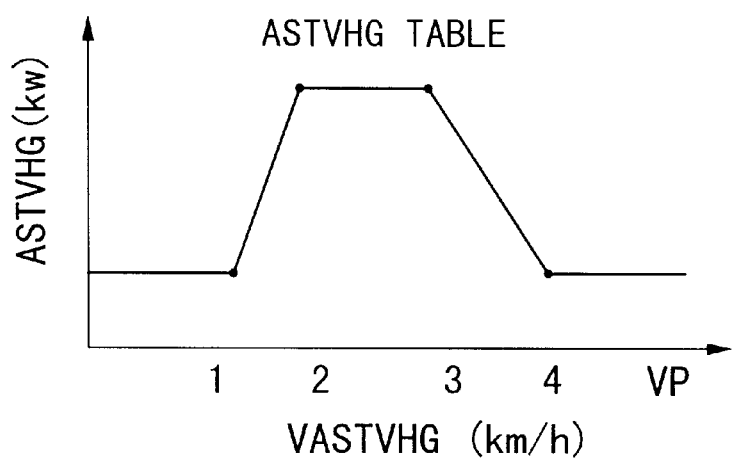
FIG. 4 is a graph showing the upper limit value of the assisting amount.

In addition, in either step S029 or step S034, when a predetermined assist value is set for the final assist command value ASTPWRF, as shown in FIG. 4, in step S035 the assist amount upper limit value ASTVHG is obtained in a table search depending on the control speed VP. In addition, step S036 determines as to whether or not the final assist command value ASTPWRF is equal to or greater than the assist amount upper limit value ASTVHG, and in the case that the result of the determination is "YES", in step S037, the assist amount upper limit value ASTVHG is set to the final assist command value, and in step S038, the final power generation amount is set to "0", and the flow goes to RETURN.

In step S036, in the case that the result of the determination is "NO", the flow goes to step S038. Therefore, in this acceleration mode, among the assist amounts that correspond to the assist determination initiated by the assist request, the final assist command value ASTPWRF is set to the largest assist value, and at the same time the power generation amount is set to "0".

Figure 5:
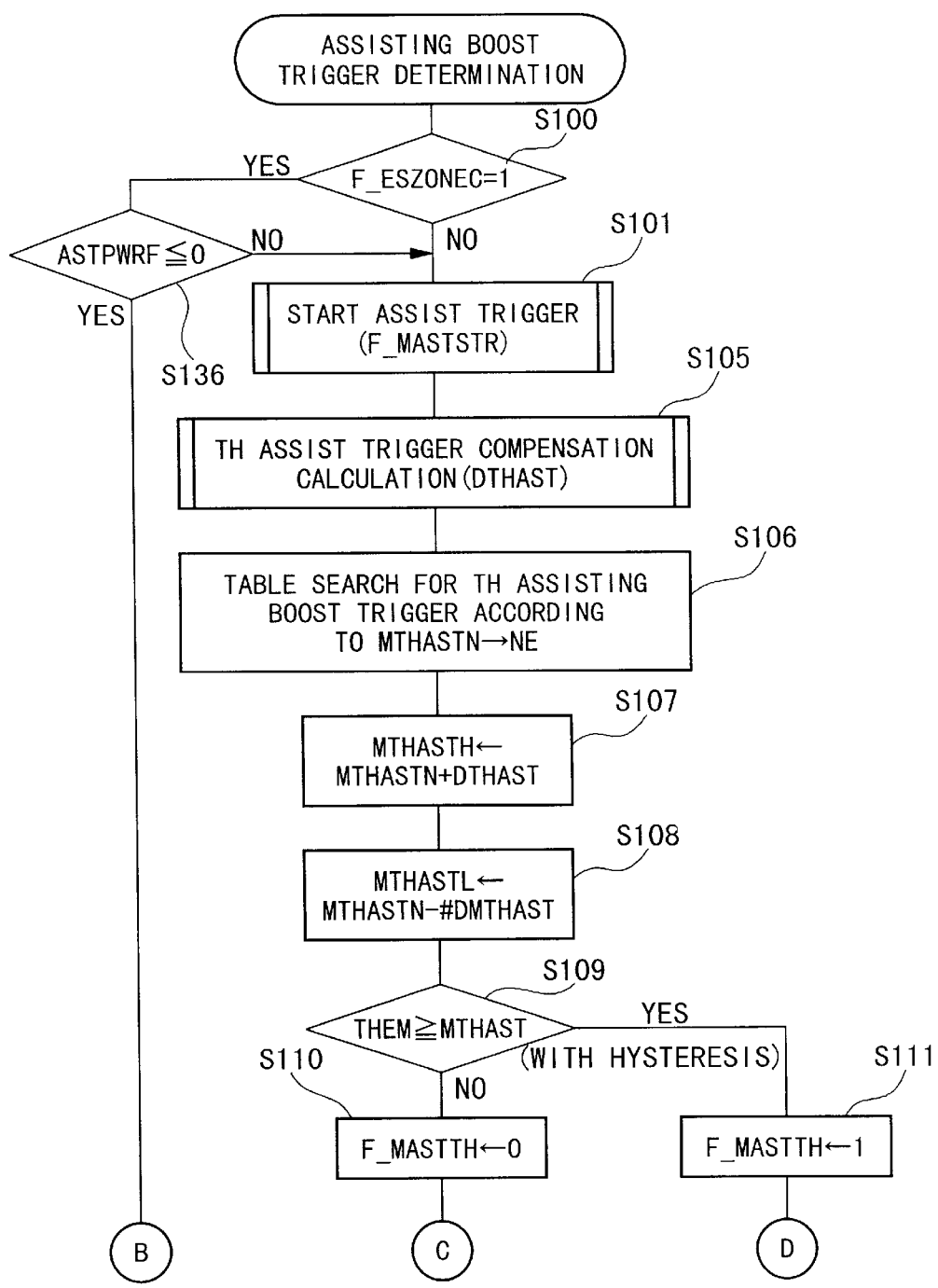
FIG. 5 is a flowchart of the normal assist trigger determination.
Figure 6:
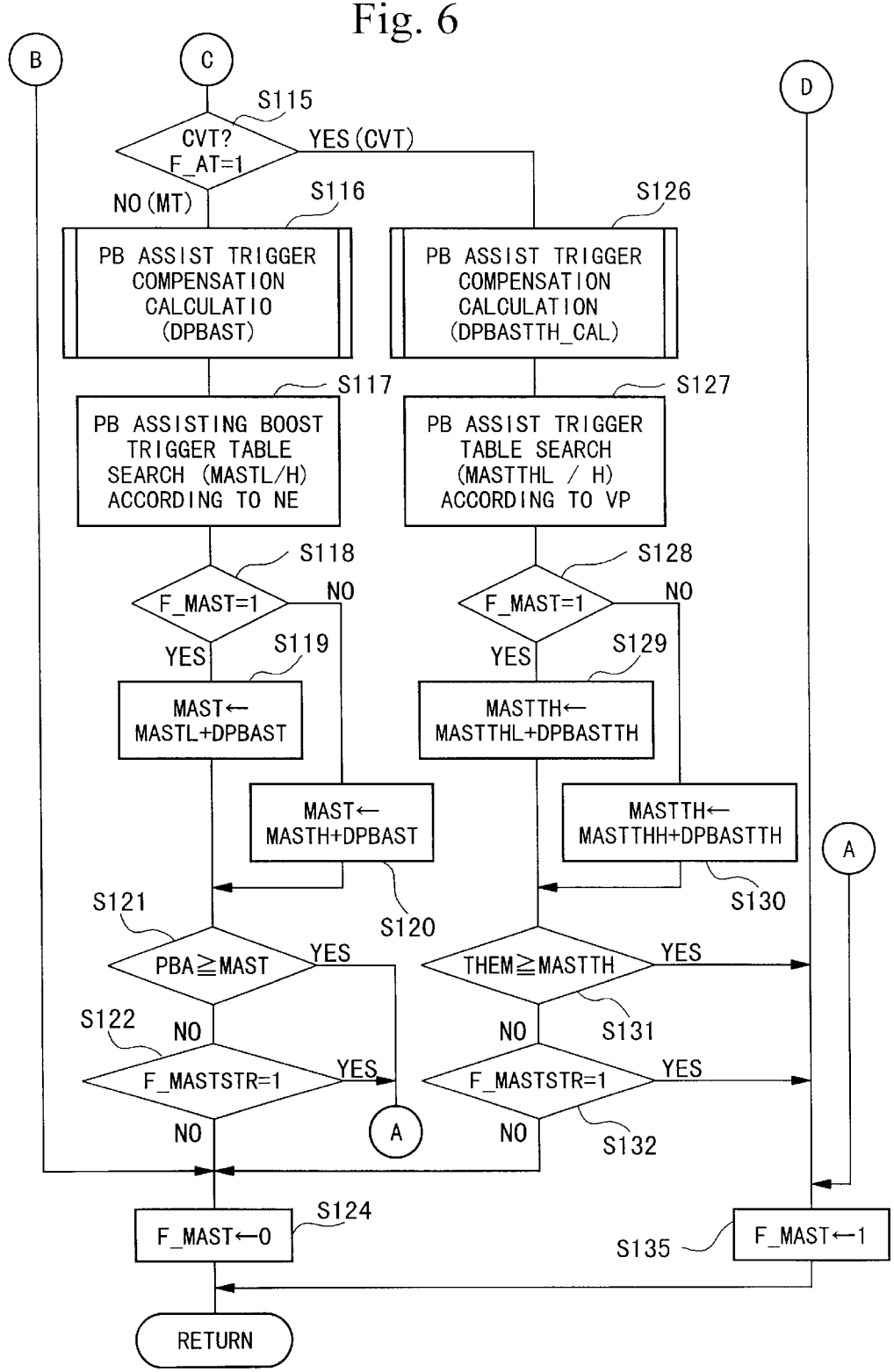
FIG. 6 is a flowchart of the normal assist trigger determination.

FIG. 5 and FIG. 6 are flowcharts of the normal assist trigger determination, and practically, these flowcharts determine the assist/cruise mode according to the mode zoning, and determine whether or not to provide an assist during acceleration. This determination essentially represents the assist trigger determination in step S004 of FIG. 2.

In step S100, a determination is made as to whether or not the flag value of the energy storage zone C flag F_ESZONEC is "1". In the case that the result of the determination is "YES", that is, it is determined that the state of charge SOC is in the C zone, step S136 determines as to whether the final assist command value ASTPWRF is equal to or less than "0". In the case that the result of the determination in step S136 is "YES", that is, it is determined that the final assist command value ASTOWRF is equal to or less than "0", in step S124, the motor assist determination flag F_MAST is assigned "0", and the flow goes to RETURN.

In the case that the result of the determination in step S100 and step S136 is "NO", step S101 carries out the start assist trigger determination. While the details are described below, it is noted that, because the start assist trigger determination processing aims to improve the start performance as described above, this processing is for carrying out calculation of the normal assist amount during departure separately from those same calculations for the start assist trigger value and the assist amount high load pressure when the intake pipe pressure PB has exceeded a predetermined pressure, and as a result of this processing, in the case that it is determined that start assist control is necessary, the start assist request flag F_MASTSTR is set to "1".

Next, in step S105, the processing of the calculation of the throttle assist trigger compensation value DTHAST is carried out. In this calculation processing, compensation in the case that the air conditioner clutch is in operation and compensation for atmospheric pressure is carried out. That is, because whenever the accelerator pedal is pressed more than normal in the case that the air conditioner clutch is in operation or in the case that the vehicle is traveling at a high altitude, if the threshold of the motor assist is not compensated by just this amount, the vehicle will frequently enter the assist mode.

Next, in step S106, the threshold MTHASTN, which becomes the standard of the throttle assist trigger, is obtained in the throttle assist trigger table. This throttle assist trigger table assigns the threshold value MTHAST of the degree of throttle opening which becomes the reference for the determination as to whether or not the motor should provide an assist as a function of the engine rotation speed NE, and the threshold value is set depending on the engine rotation speed NE.

Next, in step S107 and step S108, the compensation value DTHAST calculated in the above-described step S105 is added to the reference threshold value MTHASTN of the throttle assist trigger obtained in the above-described step S106, and the high throttle assist trigger threshold value MTHASTH is obtained. At the same time, the difference #DMTHAST for setting the hysteresis is subtracted from this high throttle assist trigger threshold MTHASTH, and the low throttle assist trigger threshold value MTHASTL is obtained.

In addition, step S109 determines as to whether or not the current throttle opening value THEM is equal to or greater than the throttle assist trigger threshold value MTHAST that was obtained in steps S107 and S108. The throttle assist trigger threshold value MTHAST is the value possessed by the above-described hysteresis, and respectively refers to the high throttle assist trigger threshold value MTHASTH when the degree of throttle opening is exhibiting a tendency to increase, and refers to the low throttle assist trigger threshold value MTHASTL when the degree of throttle opening is exhibiting a tendency to decrease.

In the case that the result of the determination in step S109 is "YES", that is, in the case that the current value THEM of the degree of throttle opening is equal to or greater than the throttle assist trigger threshold value MTHAST (the threshold value that sets the level of the hysteresis), the flow goes to step S111, and in the case that the results of the determination are "NO", that is, in the case that the current throttle opening value THEM is not equal to or greater than the assist trigger threshold value MTHAST (the threshold value that sets the level of the hysteresis), the flow goes to step S110.

In step S111, the throttle motor assist determination flag F_MASTTH is set to "1", in the next step S135, the motor assist determination flag F_MAST is set to "1", and the flow goes to RETURN. Meanwhile, at step S110, the throttle motor assist determination flag F_MASTTH is set to "0".

The processing up to this point is for carrying out a determination as to whether or not the degree of throttle opening TH is an opening that requires an assist from the motor, and in the case that step S109 determines that the current throttle opening value THEM is equal to or greater than the throttle assist trigger threshold value MTHAST, the throttle motor assist determination flag F_MASTTH is set to "1".

In contrast, setting the throttle motor assist determination flag F_MASTTH to "0" in step S110 indicates that this is not the range within which a determination that an assist from the motor is necessary based on the degree of throttle opening. In this embodiment, the determination of the assist trigger is carried out using both the degree of throttle opening TH and the intake tube load pressure PB of the engine, and in the case that the current value THEM of the degree of throttle opening is equal to or greater than the above-described throttle assist trigger threshold value MTHAST, the determination of the assist is carried out based on the degree of throttle opening TH, and within the range wherein this threshold value is not exceeded, a determination according to the intake pipe pressure PB described below is carried out.

In addition, step S115 determines as to whether value of the MT/CVT determination flag F_AT is "1". In the case that the result of the determination is "NO", that is, it is determined to be an MT vehicle, the flow goes to step S116. In the case that the result of the determination in step S115 is "YES", that is, it is determined to be a CVT vehicle, the flow goes to step S126. In step S116, the processing for calculating the intake pipe pressure assist trigger compensating value DPBAST is carried out. The content of this processing, like that of the throttle assist trigger compensation calculation in step S105 described above, is the compensation in the case that the air conditioner clutch is in operation or compensation for atmospheric pressure, and raises the threshold value of the motor assist depending on each of the compensation values.

Next, in step S117, the threshold value MASTL/H of the intake pipe pressure assist trigger is obtained in the intake pipe pressure assist trigger table. This intake pipe pressure assist trigger table assigns the high intake pipe pressure assist trigger threshold value MASTH and the low intake pipe pressure assist trigger threshold value MASTL for determining whether or not an assist should be provided by the motor as a function of the engine rotation speed NE. In the search processing in step S117, depending on the increase of the intake pipe pressure PBA or depending on the decrease in engine rotation speed NE, the motor assist determination flag F_MAST is set from "0" to "1" when the high threshold value line MASTH of the intake pipe pressure assist trigger table passes from high to low, and contrariwise, depending on the decrease of the intake pipe pressure PBA or depending on the increase in the engine rotation speed NE, the motor assist determination flag F_MAST is set from "1" to "0" when the low threshold value line MASTL passes from high to low.

In addition, the next step S118 determines as to whether or not the value of the motor assist determination flag F_MAST is "1". In the case that the result of the determination is "1", the flow goes to step S119, and in the case that the result of the determination is not "1", the flow goes to step S120. In addition, in step S119, the intake pipe assist trigger threshold value MAST is calculated as the value obtained by adding the low threshold value MASTL of the intake pipe pressure assist trigger obtained in step S117 to the compensation value DPBAST calculated in step S116, and step S121 determines as to whether or not the current value PBA of the intake pipe pressure is equal to or greater than the intake pipe assist trigger threshold value MAST obtained in step S119.

In the case that the result of the determination in step S121 is "YES", the flow goes to step S134. In the case that the result of the determination in step S121 is "NO", the flow goes to step S122. In addition, in step S120, the intake pipe assist trigger threshold value MAST is calculated as the value obtained by adding the high threshold value MASTH of the intake pipe pressure assist trigger obtained in step S117 to the compensation value DPBAST calculated in step S116, and then the flow goes to step S121.

Next, step S122 determines as to whether the start assist request flag F_MASTSTR is "1". In the case that the result of the determination is "YES", flow goes to step S134. In the case that the result of the determination is "NO", flow goes to step S124, the motor assist determination flag F_MAST is assigned "0", and the flow goes to RETURN.

In the case that the result of the determination of the value of the MT/CVT determination flag F_AT is "YES", that is, it is determined to be a CVT vehicle, in step S126, processing to calculate the intake pipe pressure assist trigger compensation value DPBASTTH is carried out. The content of this processing, like the throttle assist trigger compensation calculation in step S105 described above, is compensation in the case that the air conditioning clutch is in operation and compensation for atmospheric pressure, and the threshold value of the motor assist is raised by each of these compensation values.

Next, step S127 obtains the threshold value MASTTHL/H of the intake pipe pressure assist trigger from the intake pipe pressure assist trigger table. For the engine control speed VP, this intake pipe pressure assist trigger table assigns the high intake pipe pressure assist trigger threshold value MSAT-THH and the low intake pipe pressure assist trigger threshold value MASTTHL for determining whether or not the motor should provide an assist. In the search processing of step S127, depending on the increase of the degree of throttle opening TH or depending on the decrease in engine control speed VP, the motor assist determination flag F_MAST is set from "0" to "1" when the high threshold value line MASTHH passes from low to high, and contrariwise, depending on the decrease in the degree of throttle opening TH or depending on the increase in the engine control speed VP, the motor assist determination flag F_MAST is set from "1" to "0" when the low threshold value line MASTTHL passes from high to low.

In addition, the next step S128 determines as to whether or not the value of the motor assist determination flag F_MAST is "1". In the case that the result of the determination is "1", the flow goes to step S129, and in the case that the result is not "1", goes to step S130. In addition, in step S129, the intake pipe assist trigger threshold value MASTTH is calculated as the value obtained by adding the low threshold value MASTTHL of the intake pipe pressure assist trigger obtained in step S127 to the compensation value DPBASTTH calculated in step S126, and step S131 determines as to whether or not the current value THEM of the degree of throttle opening is equal to or greater than the intake pipe assist trigger threshold value MASTTH obtained in step S129. In the case that the result of the determination is "YES", the flow goes to step S134. In the case that the result of the determination is "NO", the flow goes to step S132.

In addition, in step S130, the intake pipe assist trigger threshold value MASTTH is calculated as the value obtained by adding the high threshold value MASTTHH of the intake pipe pressure assist trigger obtained in step S127 to the compensation value DPBASTTH calculated in step S126, and the flow goes to step S131.

Next, step S132 determines as to whether the start assist request flag F_MASTSTR is "1", and in the case that the result of the determination is "YES", the flow goes to step S134. In the case that the results of the determination in step S132 is "NO", the flow goes to step S124.

Figure 7:
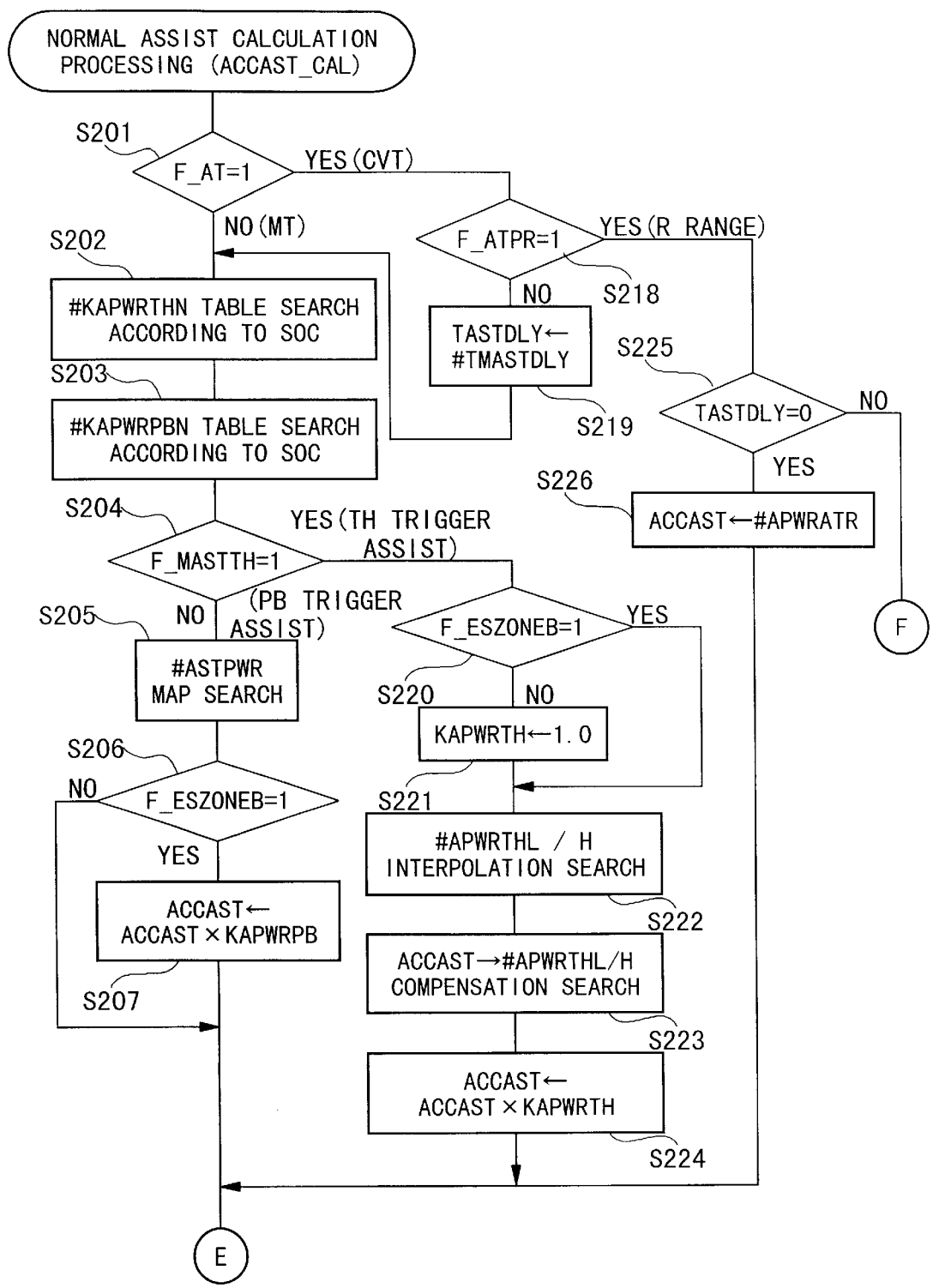
FIG. 7 is a flowchart showing the normal assist calculation processing.
Figure 8:
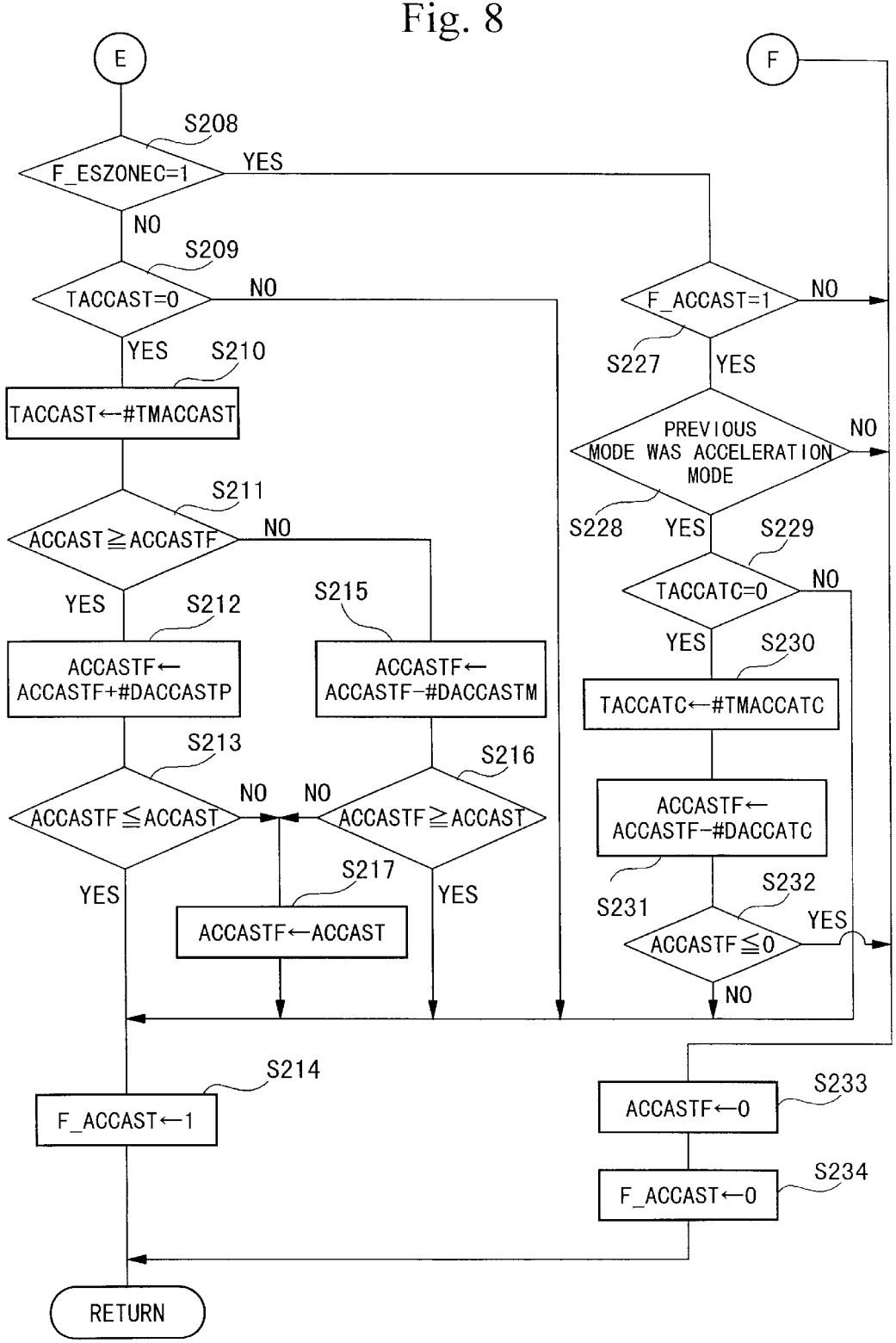
FIG. 8 is a flowchart showing the normal assist calculation processing.

FIG. 7 and FIG. 8 are flowcharts showing the normal assist calculation processing. In this processing, the amount of the assist of the normal assist in step S023 in FIG. 3 is calculated.

Step S201 determines as to whether or not the MR/CVT determination flag F_AT is "1". In the case that the result determines that the vehicle is a CVT vehicle, the flow goes to step S218. In the case result of the determination in step S201 is that it is an MT vehicle, the flow goes to step S202.

In step S202, a table is searched for the throttle assist amount coefficient KAPWRTH, which depends on the state of charge SOC, and in the next step S203, a table is searched for the intake pipe pressure assist amount coefficient KAPWRPB, which depends on the state of charge SOC. Then, the flow goes to step S204. Moreover, the throttle assist amount coefficient KAPWRTH and the intake pipe pressure assist amount coefficient KAPWRPB correspond to determining the amount of the assist, and are coefficients of 1 or less that multiply the amount of the assist, which depends on the state of charge SOC, and whose values decrease along with the decrease in the state of charge SOC.

Step S204 determines as to whether the throttle motor assist determination flag F_MASTTH is "1". When the result of the determination is "YES", that is, when it is determined to within be the throttle assist range, flow goes to step S220, and then it is determined whether or not the energy storage zone B flag F_ESZONEB is "1". In the case that the result of the determination is "NO", that is, it is determined that the state of charge SOC is outside of the B zone, in step S221, the throttle assist amount coefficient KAPWRTH is set to 1.0, and the flow goes to step S222. In the case that the result of the determination of step S220 is "YES", the flow goes to step S222.

Step S222 sets the high throttle assist amount threshold value APWRTHH and the low throttle assist amount threshold value APRWTHL, which depend on the engine rotation speed NE. Moreover, between each of these values, a fixed interval is set that depends on the engine rotation speed NE.

Next, the flow goes to step S223, and here the normal assist calculated value ACCAST is obtained. This normal assist calculated value ACCAST is obtained by interpolating the relationship between the throttle assist trigger threshold value MTHAST and the throttle TH opening #MTHASTH which has changed a specific opening from this throttle assist trigger threshold value MTHAST (for example, the opening obtained by a function of the engine rotation speed NE) and the relationship between the high throttle assist amount threshold value APWRTHH and the low throttle assist amount threshold value APRWTHL that were obtained in step S222 above.

In addition, in step S224, the normal assist calculated value ACCAST is set by multiplying the normal assist calculated value ACCAST by the throttle assist amount coefficient KAPWRTH, and the flow goes to step S208.

In the case that the result of the determination in step S204 is "NO", that is, it is in the intake pipe pressure assist range, the flow goes to step S205, where the assist amount is obtained as a function of the engine rotation speed NE and the intake pipe pressure PB by a map, not illustrated, and the map value #ASTPWR is set to the normal assist calculated value ACCAST. In addition, the next step S206 determines as to whether the energy storage zone B flag F_ESZONEB is "1". In the case that the result of the determination is "NO", that is, that the state of charge SOC is outside the B zone, the flow goes to step S208. In the case that the result of the determination in step S206 is "YES", in step S207 the normal assist calculated value ACCAST set by multiplying the normal assist calculated value ACCAST by the intake pipe pressure assist coefficient KAPWRPB, and the flow goes to step S208. Moreover, the map value #ASTPWR changes for each gear of an MT vehicle.

In the case that the result of the determination in step S227 is "YES", that is, the assist permission flag F_ACCAST is "1", step S228 determines as to whether or not the previous step was in the acceleration mode. If the result of the determination is "NO", that is, the previous step was not in the acceleration mode, then the flow goes to step S233. If the result of the determination in step S228 is "YES", that is, it is determined that the previous step was in the acceleration mode, the flow goes to step S229, which determines as to whether the step-wise subtraction update timer TACCATC is "0". In the case that it is determined that the step-wise subtraction update timer TACCATC is not "0", the flow goes to step S214. In the case that the result of the determination in step S229 determines that the step-wise subtraction update timer TACCATC is "0", the flow goes to step S230.

In the case that the result of the determination in step S225 is that the assist determination delay timer TASTDLY is "0", the flow goes to step S226, wherein the predetermined value #APWRATR is assigned to the normal assist calculated value ACCAST, and the flow goes to step S208. In the case that the result of the determination in step S218 is "NO", the flow goes to step S219, and here the assist determination delay timer TASTDLY is assigned the predetermined value #TMASTDLY, and the flow goes to step S202.

Next, step S208 determines as to whether the energy storage zone C flag F_ESZONEC is "1". In the case that the result of the determination in step S208 is "YES", that is, the state of charge SOC is in zone C, the flow goes to step S227.

Step S227 determines as to whether the assist permission flag F_ACCAST is "1". In the case that the result of the determination is "NO", that is, the assist permission flag F_ACCASTF is "0", the flow goes to step S233.

In the case that the result of the determination in step S227 is "YES", that is, the assist permission flag F_ACCAST is "1", step S228 determines as to whether the previous step was in the acceleration mode. If the result of the determination is "NO", that is, the previous step was not in the acceleration mode, then the flow goes to step S233. If the result of the determination in step S228 is "YES", that is, it is determined that the previous step was in the acceleration mode, the flow goes to step S229, which determines as to whether the step-wise subtraction update timer TACCATC is "0". In the case that it is determined that the step-wise subtraction update timer TACCATC is not "0", the flow goes to step S214. In the case that the result of the determination in step S229 determines that the step-wise subtraction update timer TACCATC is "0", the flow goes to step S230.

In step S230, the step-wise subtraction update timer TACCATC is assigned the timer value #TMACCATC, and in step S231 the step-wise subtraction term #DACCATC is subtracted each time from the normal assist final calculated value ACCASTF, and step S232 determines as to whether or not the normal assist final calculated values ACCASTF is equal to or less than 0. In the case that the result of the determination is equal to or less than 0, the flow goes to step S233. In the case that the result of the determination exceeds 0, the flow goes to step S214.

In the case that the result of the determination in step S208 is "NO", the flow goes to step S209, which determines as to whether the step-wise addition step-wise subtraction update timer TACCAST is "0". In the case that the result of the determination is that the step-wise addition step-wise subtraction update timer TACCAST is not "0", the flow goes to step S214. In the case that the result of the determination in step S209 is that the step-wise addition step-wise subtraction update timer TACCAST is "0", the flow goes to step S210.

In step S210, the step-wise addition step-wise subtraction update timer TACCAST is assigned the timer value #TMACCAST, and step S211 determines as to whether or not the normal assist calculated value ACCAST is equal to or greater than the normal assist final calculated value ACCASTF. In the case that the result of the determination in step S211 is "YES", that is, it is determined that the normal assist calculated value ACCAST the normal assist final calculated value ACCASTF, in step S212, the step-wise adding term #DACCASTP (for example, 0.1 kw) is added to the normal assist final calculated value ACCASTF, and step S213 determines as to whether the normal assist final calculated value ACCASTF is equal to or less than the normal assist calculated value ACCAST.

In the case that the result of the determination in step S213 is "YES", that is, it is determined that the normal assist final calculated value ACCASTF≧the normal assist calculated value ACCAST, in step S214, the assist permission flag F_ACCAST is set to "1", and the flow goes to RETURN. In the case that the result of the determination in step S213 is "NO", that is, it is determined that the normal assist final calculated value ACCASTF>the normal assist calculated value ACCAST, in step S217, the normal assisting final calculated value ACCASTF is assigned the normal assist calculated value ACCAST, and the flow goes to step S214.

In the case that the result of the determination in step S211 is "NO", that is, it is determined that the normal assisting calculated value ACCAST<the normal assist final calculated value ACCASTF, in step S215 the step-wise subtraction term #DACCASTM (for example, 0.1 kw) is subtracted from the normal assist final calculated value ACCASTF, and step S216 determines as to whether the normal assist final calculated value ACCASTF is equal to or greater than the normal assist calculated value ACCAST.

In the case that the result of the determination in step S216 is "YES", that is, it is determined that the normal assist final calculated value ACCASTF≧the normal assist calculated value ACCAST, the flow goes to step S214. In the case that the result of the determination in step S216 is "NO", that is, it is determined that the normal assist final calculated value ACCASTF<the normal assist calculated value ACCAST, the flow goes to step S217. Here, preferably this normal assist final calculated value ACCASTF is set such that the state of charge SOC in B zone gradually increases from the boundary with zone C to the boundary with zone A depending on the state of charge SOC.

Figure 9:
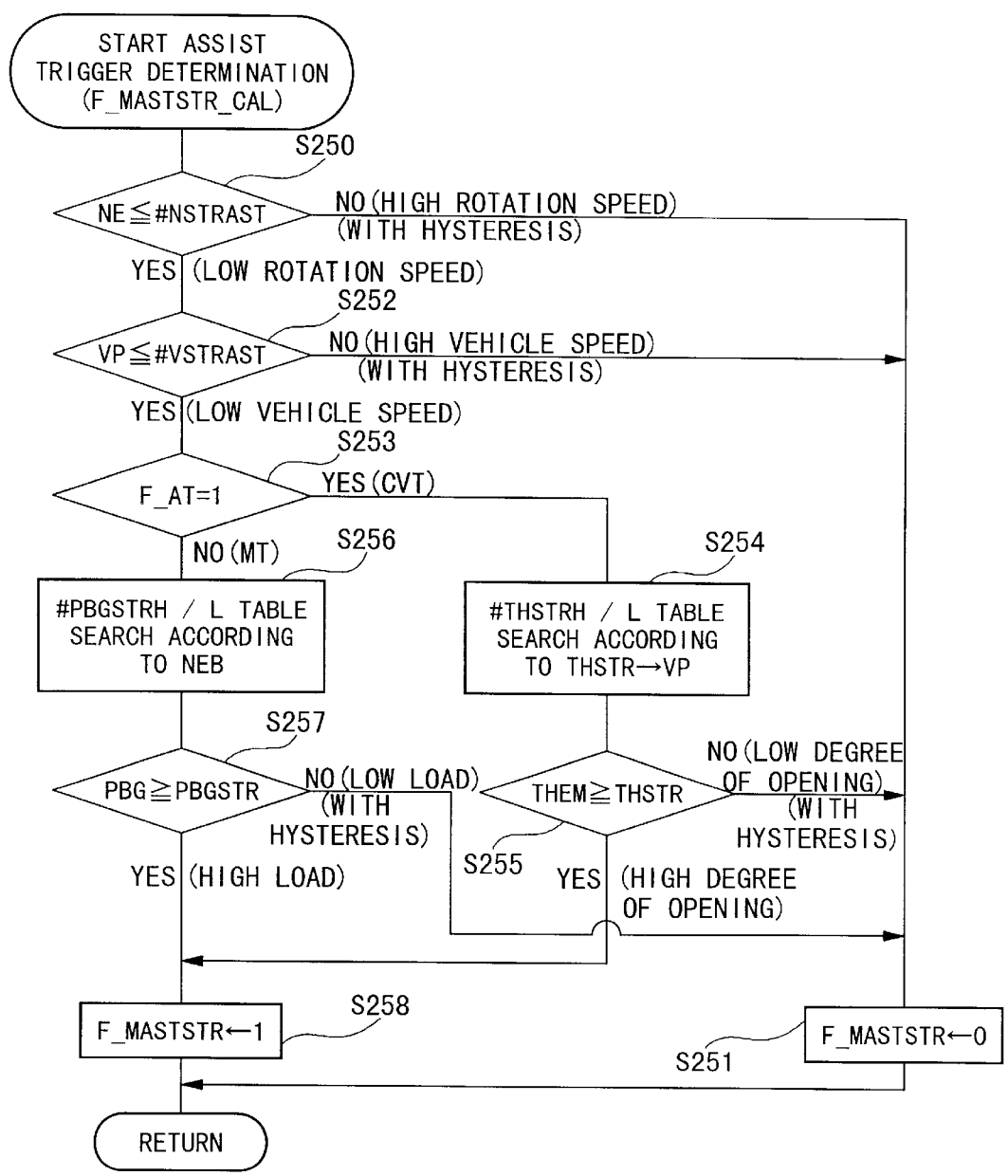
FIG. 9 is a flowchart showing the start assist trigger determination.

FIG. 9 is a flowchart that shows the start assist trigger determination in step S101 of FIG. 5.

Step S250 determines as to whether the engine rotation speed NE is equal to or greater than the start assist execution upper limit value #NSTRAST (for example, a value having a hysteresis with a lower limit of 800 rpm and an upper limit of 1000 rpm). In the case that the result of the determination is "NO", that is, there is a high rotation speed, in step S251 the start assist request flag F_MASTSTR is set to "0", and the flow goes to RETURN.

In the case that the result of the determination is "YES", that is, there is a low rotation speed, step S252 determines as to whether or not the control vehicle speed VP is equal to or less than the start assist execution upper limit vehicle speed #VSTRAST (for example, a value having a hysteresis with a lower limit of 10 km/h and an upper limit of 14 km/h). In the case that the result of the determination is "NO", that is, there is a high vehicle speed, the flow goes to step S251. In the case that the result of the determination is "YES", that is, there is a low vehicle speed, the flow goes to step S253.

Figure 10:
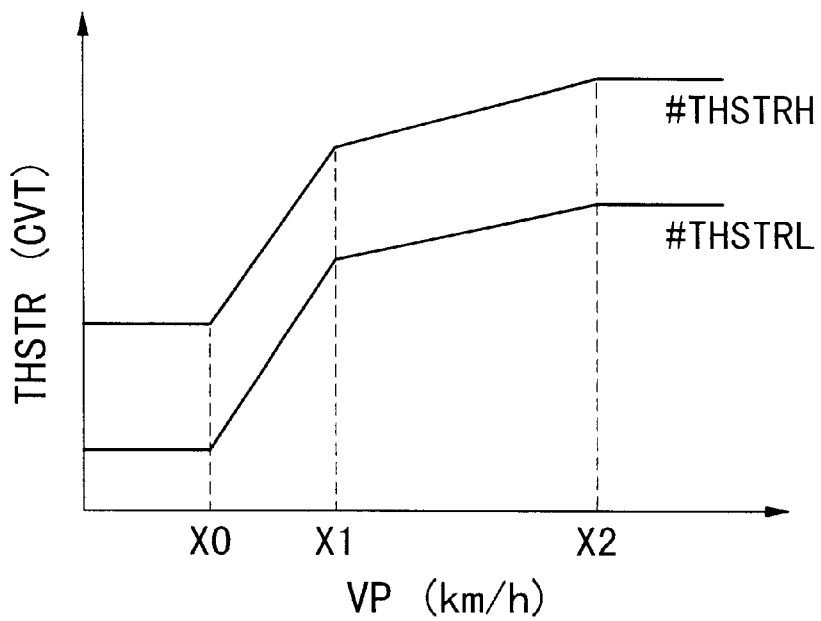
FIG. 10 is a flowchart showing the degree of throttle opening as a function of the vehicle speed.

Step S253 determines as to whether the MT/CVT determination flag F_AT is "1". In the case that the result of the determination is a CVT vehicle, the flow goes to step S254. In the case that the result of the determination in step S253 is an MT vehicle, the flow goes to step S256. In step S254, as shown in FIG. 10, the start assist execution throttle opening lower limit value THSTR, which depends on the control vehicle speed VP, is obtained by searching a table as a value that serves as the hysteresis.

In addition, step S255 determines as to whether or not the current degree of throttle opening THEM is equal to or greater than the start assist execution throttle opening lower limit value THSTR, and in the case that the result of the determination is "NO", that is, there is a low opening, the flow goes to step S251. In addition, in the case that the result of the determination in step S255 is "YES", that is, there is a high opening, the flow goes to step S258, the start assist request flag F_MASTSTR is set to "1", and the flow goes to RETURN.

Figure 11:
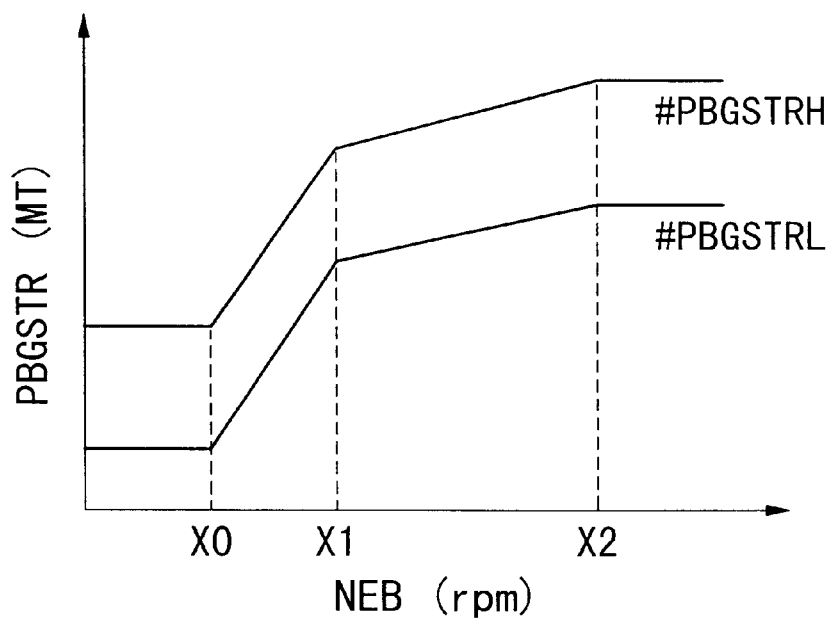
FIG. 11 is a graph showing the pressure in the intake pipe as a function of the vehicle speed.

As show in FIG. 11, in step S256, the start assist execution intake pipe pressure lower limit value PBGSTR, which depends on the engine rotation speed NEB, is obtained by searching a table as a value that serves as the hysteresis. In addition, step S257 determines as to whether or not the intake pipe pressure PBG is equal to or greater than the start assist execution intake pipe pressure lower limit value PBGSTR, and in the case that the result of the determination is "NO", that is, there is a low load pressure, the flow goes to step S251.

In addition, in the case that the result of the determination in step S257 is "YES", that is, there is a high load pressure, the flow goes to step S258, the start assist request flag F_MASTSTR is set to "1", and the flow goes to RETURN. Moreover, preferably the assist trigger threshold value of the start assist trigger is set to be less than the normal assist trigger, that is, set so that the assist is easily applied.

In this manner, an acceleration performance that responds quickly to the acceleration intentions of the driver during start-up can be attained.

Figure 12:
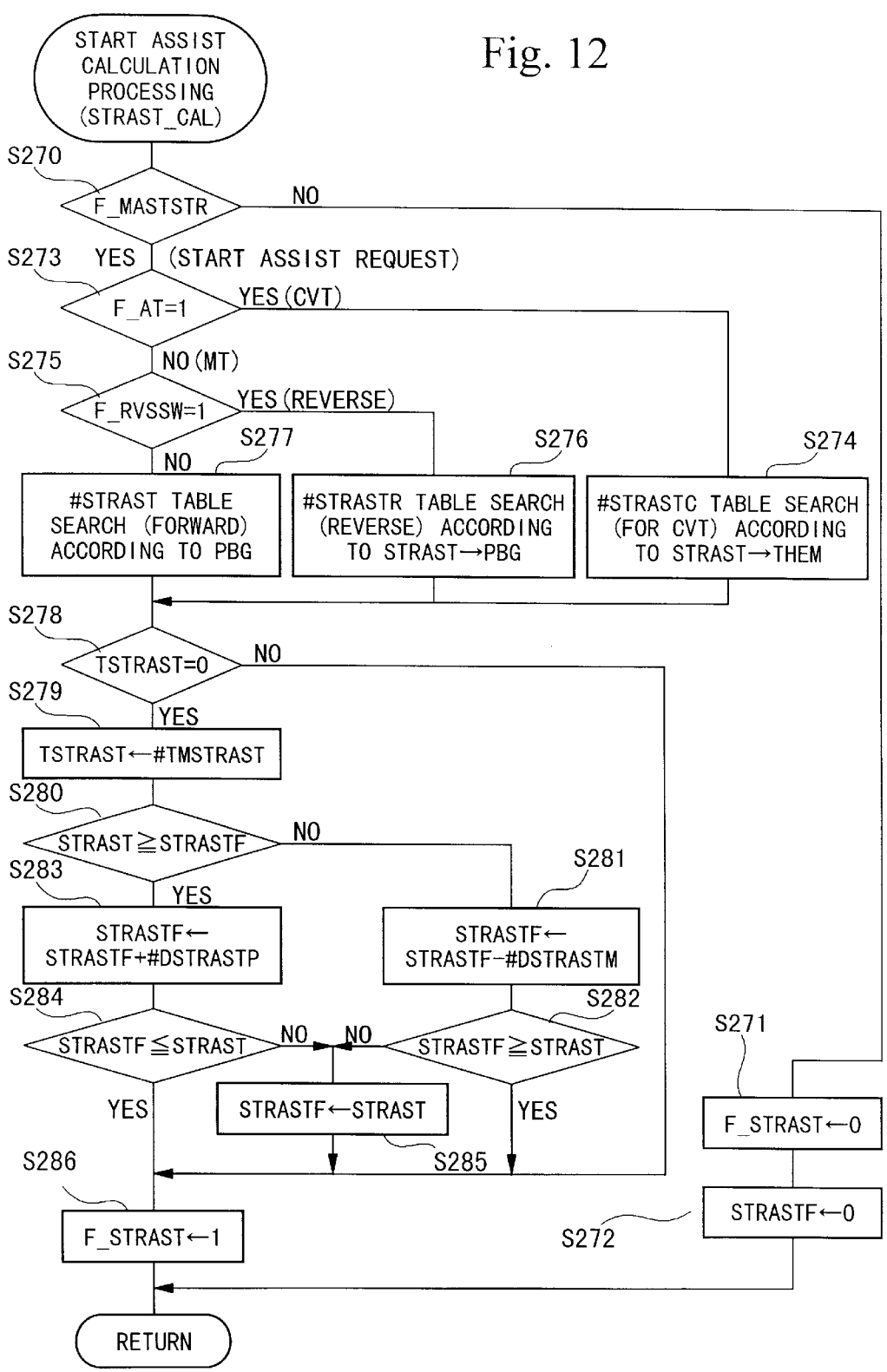
FIG. 12 is a flowchart showing the start assist calculation processing.

FIG. 12 is a flowchart of the start assist calculation processing of step S024 in FIG. 3, and generally the amount of the assist is set.

Step S270 determines as to whether the start assist request flag F_MASTSTR is "1". In the case that the result of the determination is "NO", that is, there is no start assist requested, in step S271, the start assist permission flag F_STRAST is set to "0", the start assist final calculated value is set to "0", and flow goes to RETURN.

Figure 13:
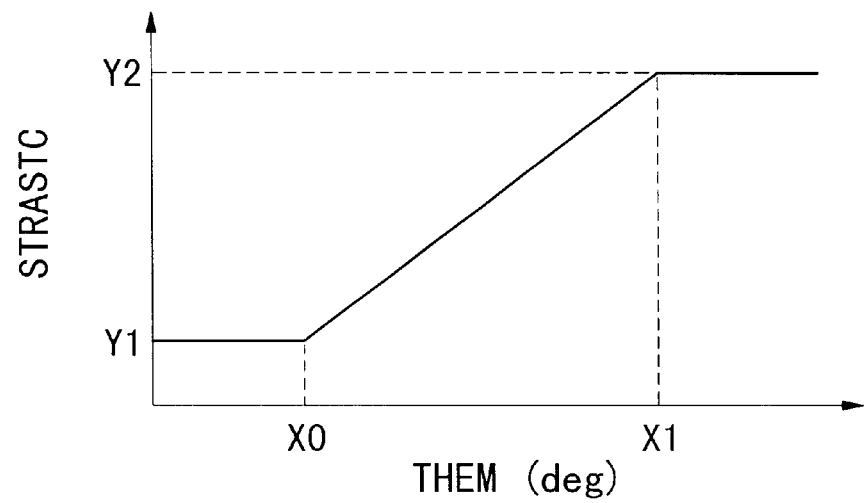
FIG. 13 is a graph showing the assisting amount as a function of the degree of throttle opening.

In the case that the result of the determination in step S270 is "YES", that is, that there is a start assist request, the flow goes to step S273, which determines as to whether the MT/CVT determination flag is "1". In the case that it is a CVT vehicle, the flow goes to step S274, and the start assist calculated value STRAST, which depends on the current throttle opening THEM, as shown in FIG. 13, is calculated by searching a table. Then the flow goes to step S278.

Figure 14:
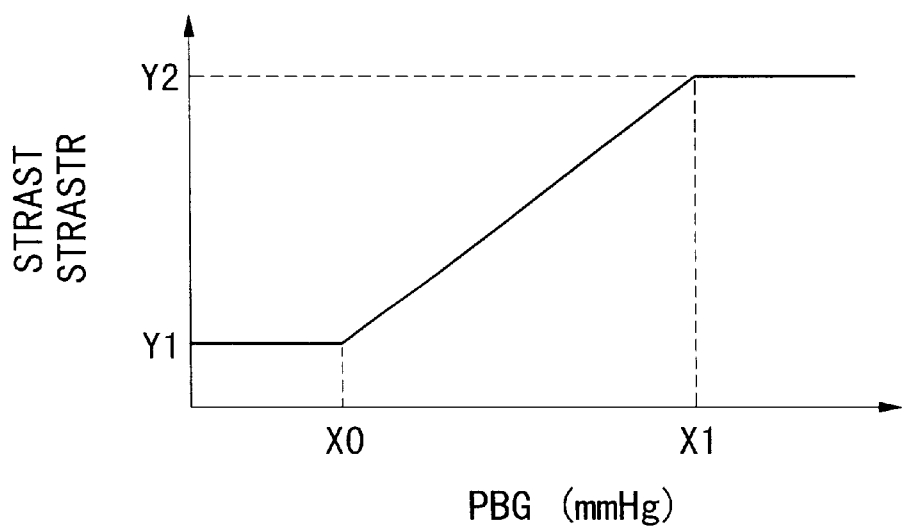
FIG. 14 is a graph showing the assisting amount as a function of the pressure of the intake pipe.

In the case that the result of the determination in step S273 is an MT vehicle, the flow goes to step S275, which determines as to whether the reverse switch flag F_RVSSW is "1". In the case that the result of the determination is reverse, in step S276, the start assist calculated value STRAST, which depends on the load pressure between intakes, as shown in FIG. 14, is calculated by searching a table. Then the flow goes to step S278.

In addition, in the case that the result of the determination in step S275 is foreword, in step S277, as shown in the same FIG. 14, the start assist calculated value STRAST, which depends on the intake pipe pressure PBG, is calculated by searching a table, and the flow goes to step S278.

Step S278 determines as to whether or not the step-wise addition step-wise subtraction timer TSTRAST is "0", and in the case that it is not "0", the flow goes to step S286. In the case that it is "0", the flow goes to step S279. In step S279, the step-wise addition step-wise subtraction timer TSTRAST is set to a predetermined value #TMSTRAST (for example, 50 ms), and the flow goes to step S280.

Step S280 determines as to whether or not the start assist calculated value STRAST is equal to or greater than the start assist final calculated value STRASTF. In the case that the result of the determination in step S280 is "YES", that is, it is determined that the start assist calculated value STRAST≧the start assisting start final calculated value STRASTF, in step S283, the step-wise addition term #DSTRASTP (for example, 0.3 kw) is added to the start assist final calculated value STRASTF, and step S284 determines as to whether or not the start assist final calculated value STRASTF is equal to or less than the start assist calculated value STRAST.

In the case that the result of the determination in step S284 is "YES", that is, it is determined that the start assist final calculated value STRASTF≦the start assist calculated value STRAST, in step S286, the start assist permission flag F_STRAST is set to "1", and the flow goes to RETURN. In the case that the result of the determination in step S284 is "NO", that is, it is determined that the start assist final calculated value STRASTF>the start assist calculated value STRAST, in step S285, the start assist calculated value STRAST is assigned the start assist final calculated value STRASTF, and the flow goes to step S286.

In the case that the result of the determination in step S280 is "NO", that is, it is determined that the start assist calculated value STRAST<the start assist final calculated value STRASTF, in step S281 the step-wise subtraction term #DSTRASTM (for example, 0.3 kw) is subtracted form the start assist final calculated value STRASTF, and step S282 determines as to whether or not the start assist final calculated value STRASTF is equal to or greater than the start assist calculated value STRAST.

In the case that the result of the determination in step S282 is "YES", that is, it is determined that the start assist final calculated value STRASTF≧the start assist calculated value STRAST, the flow goes to step S286. In the case that the result of the determination in step S282 is "NO", that is, it is determined that start assist final calculated value STRASTF<the start assisting start calculated value STRAST, the flow goes to step S285.

Therefore, for each time interval set by a timer, because the assist amount is step-wise increased or step-wise decreased, a smooth sense of acceleration, without jolts, is provided, and jolts during the reduction of the assist can be eliminated. Here, because the above-described step-wise addition term #DSTRASTP is set to be greater than the step-wise addition term #DACCASTP of the normal assist in step S212, the start assist is guaranteed to rise faster than the normal assist.

Here, during a start-up that carries out assist control, because an idle stop is included in addition to the normal start-up a start-up during, the idle stop mode will be briefly explained.

The idle stop mode is a characteristic of a hybrid vehicle, and is a mode that advantageously uses the carrying out of the engine start-up by the motor to further promote improved fuel consumption. Thus, by determining the intent of the driver to stop, the idle stop mode carries out an engine stop by cutting off the fuel.

In the case of an MT vehicle, considering the necessity of making possible a motor start-up, the idle stop is carried out under such conditions as the state of charge SOC is equal to or greater than a predetermined value, the engine temperature being equal to or greater than a predetermined temperature, the throttle being completely open, the vehicle speed being equal to or less than a predetermined value, and the brake being pressed.

In the case of a CVT vehicle, the idle stop is carried out under such conditions as the state of charge SOC is equal to or greater than a predetermined value, the engine temperature being equal to or greater than a predetermined temperature, the throttle being completely open, the speed being equal to or less than a predetermined value, and the brake being pressed. Additionally, the engine will start-up when the conditions for an idle stop are no longer satisfied.

Here, each of the above-explained flowcharts have been explained for an MT vehicle and a CVT vehicle, but during the start-up as described above, torque insufficiency generally occurs in the case of the CVT vehicle, and thus it is preferably applied to a CVT vehicle. That is, in the case of a CVT vehicle, when waiting for confirmation that cranking has ended at the time of starting cranking during the start-up by the motor in order to hold the time necessary for increasing the pressure of the oil pressure circuit of the CVT, a condition can occur wherein the vehicle cannot accelerate even when the driver attempts to accelerate immediately. In the case that the vehicle has an idle stop function, the frequency of the idle stop becomes high due, for example, when waiting for signal lights, and this will cause undue stress on the driver if the problem is not solved.

Next, the operation will be explained.

Figure 15:
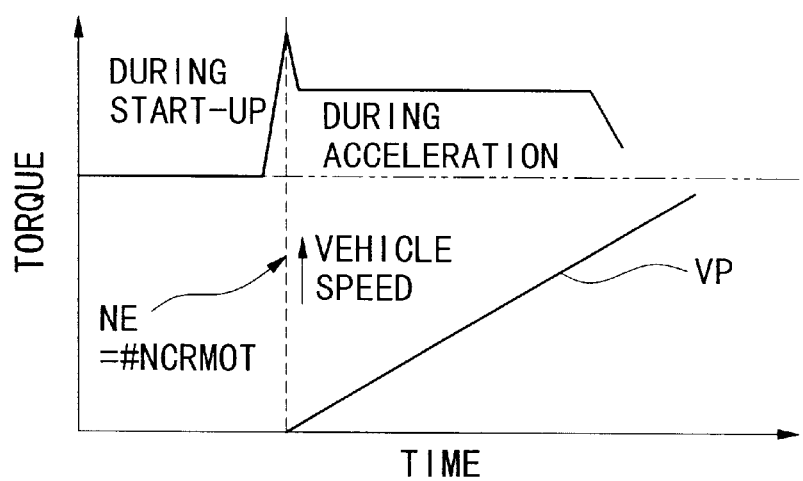
FIG. 15 is a graph showing the assisting state during start-up.

In FIG. 15, the abscissa is time, the ordinate is torque (a part of the ordinate is represented as the vehicle speed), and during a normal start-up or during a re-start-up after an idle stop, the engine is driven by the motor. In step S001 shown in FIG. 2, when the engine rotation speed is equal to or greater than a predetermined value #NCRMOT, in the case that at this point in time the driver carries out a start assist request or a normal assist request, the drive of the engine will be assisted, even during the cranking cycle.

This device, even in the case that after start-up the engine rotation speed NE exceeds a predetermined value #NCRMOT, in step S122 and step S135 shown in FIG. 5, when the motor assist determination flag F_MAST becomes "1" (an assist request caused by a start assist request), or in step S135 of FIG. 5 the motor assist determination flag F_MAST becomes "1" (an assist request caused by a normal assist request), the greater of the assist amounts that were set in step S029 and step S034 of FIG. 3 provides prompt drive assistance for the engine.

Therefore, as shown in the figures, the vehicle speed VP is promptly increased, and a sense of acceleration reflecting the intention of the driver can be attained immediately after start-up.

As a result, even in the condition reflecting the will of the driver to accelerate, or specifically, either during normal acceleration start, at a timing satisfying the request of the driver, the drive assistance for the engine can be carried out at the optimal size, and in particular after normal start-up, and after re-starting from an idle stop, a prompt acceleration can be realized, and pleasant driving is possible.

Moreover, although the present invention was explained using the case of start-up by a starter motor, the present invention can also be applied in the case of start-up by the motor.

As explained above, according to a first aspect of the present invention, using an engine rotation speed detection device during the cranking cycle by a motor during start-up, for example, in the case that it is determined that the engine rotation speed after the start-up operation of the engine has enough torque to move under its own power by rotational drive, and in the case that it is determined that the driver intends to accelerate by the output assistance permission device, because drive assistance to the engine using the motor by the output assistance permission device can be provided after start-up, the effect is attained that immediately after start-up it is possible to accelerate promptly in response to the driver's intention to accelerate.

According to a second aspect of the present invention, because the engine can promptly transit to traveling under its own power, during the engine start-up operation, there is the effect that a prompt and smooth acceleration can be attained.

What is claimed is:

1. A hybrid vehicle, comprising:

a combustion engine that outputs driving power to the vehicle;

an electric motor for assisting the output of the engine;

an electric storage device that supplies electric power to said motor;

an engine rotation speed detection device that detects the rotation speed of the engine;

an after-start-up output assist permission device that permits an assist of the engine output by the motor when the detected engine rotation speed is greater than a predetermined engine rotation speed during the engine start-up; and a control device for controlling the hybrid vehicle.

2. The hybrid vehicle recited in claim 1, wherein said engine rotation speed of said engine is the rotation speed which provides the torque that makes possible the engine operating under its own power after the engine start-up operation.

3. A hybrid vehicle comprising:

a combustion engine that outputs driving power to the vehicle;

an electric motor for assisting the output of the engine;

an electric storage device that supplies electric power to the motor;

an output assist determination device that determines appropriateness of assisting the engine output by the motor depending on the driving state of the vehicle;

a control amount setting means that sets the control amount of the motor depending on the driving state of the engine in the case that a determination is made to carry out assisting of the output of the engine with the motor by the output assist determination device;

an output assist control means that carries out assisting of the output to the engine by the motor based on the control amount set by the control amount setting device;

an engine rotation speed detection device that detects the rotation speed of the engine; and an after-start-up output assist permission device that permits an assist of the engine output by the motor when said engine rotation speed detection device detects that the engine rotation speed is greater than a predetermined engine rotation speed during the engine start-up, wherein the assist of the engine output by the motor is carried out by the output assist control means when the output assist is permitted by the after-start-up output assist permission device.

4. The hybrid engine according to claim 3, wherein said engine rotation speed of said engine is the rotation speed which provides the torque that permits the engine to operate under its own power after the engine start-up operation.

* * * * *